July 11, 1967  C. E. BERRY  3,330,478
NAVIGATION INSTRUMENTS
Filed May 31, 1966  3 Sheets-Sheet 1
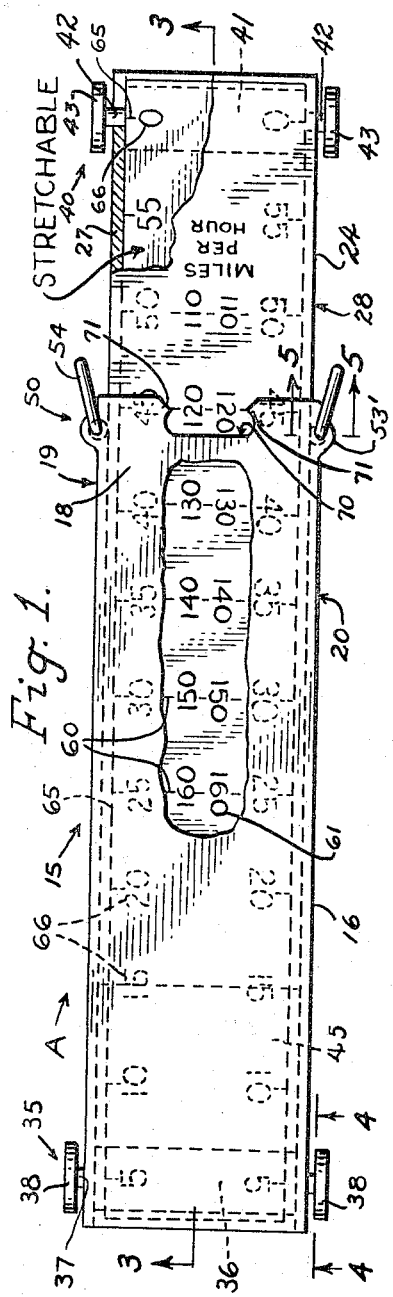
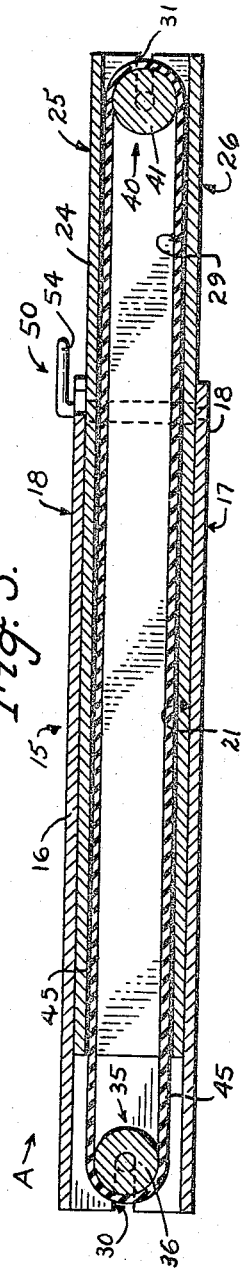
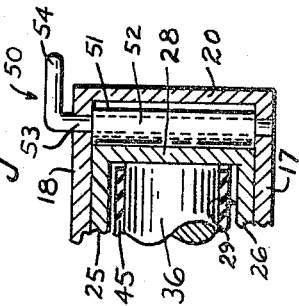
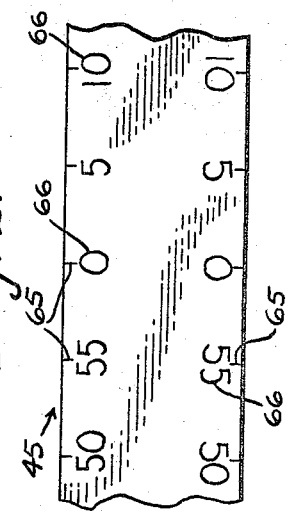
INVENTOR
CHARLES E. BERRY
BY
ATTORNEYS July 11, 1967  C. E. BERRY  3,330,478
NAVIGATION INSTRUMENTS
Filed May 31, 1966  3 Sheets-Sheet 2
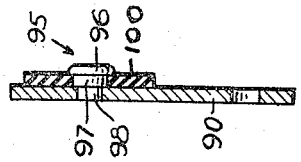
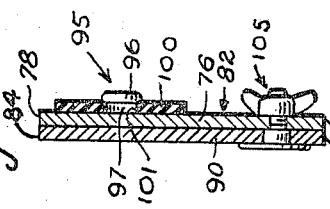
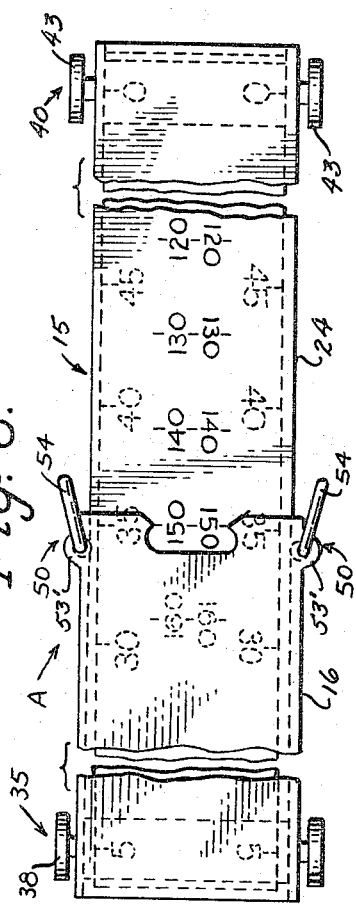
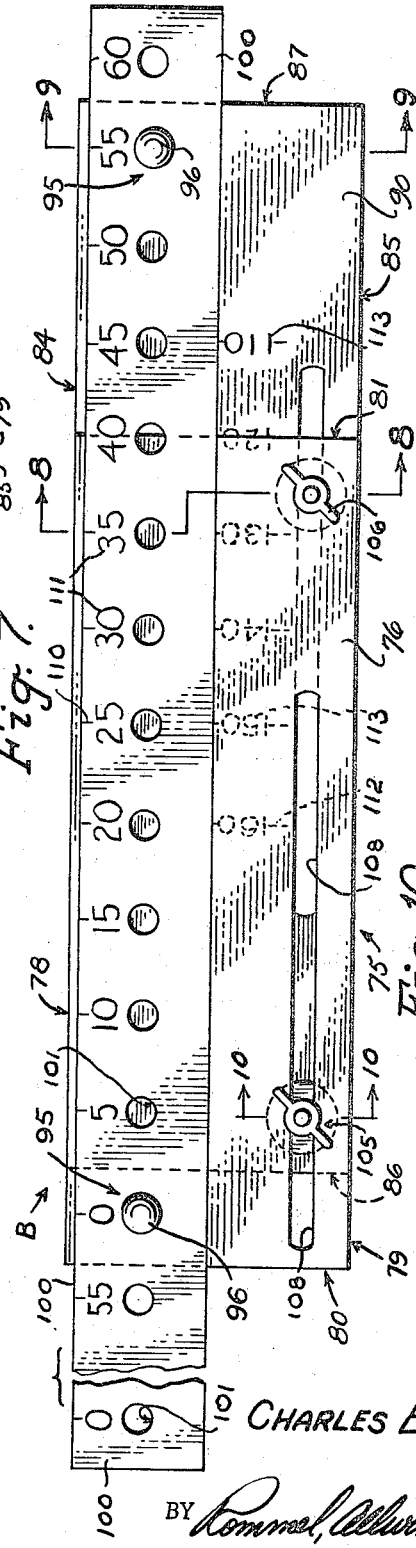
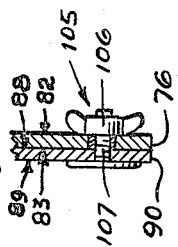
INVENTOR
CHARLES E. BERRY
BY Rommel, Alwine & Rommel
ATTORNEYS INVENTOR
CHARLES E. BERRY
BY Rommel, Allwine & Rommel
ATTORNEYS United States Patent Office 3,330,478
Patented July 11, 1967

3,330,478
NAVIGATION INSTRUMENTS
Charles E. Berry, Fairmont, W. Va.
(541 Oakwood St., Bristol, Tenn. 37620)
Filed May 31, 1966, Ser. No. 554,191
7 Claims. (Cl. 235—61)

ABSTRACT OF THE DISCLOSURE

A navigation instrument including cooperatively mounted rate of speed indicia elements and time indicia elements correlated to each other and to a chart having a linear distance measurements of a given scale, and wherein the instrument may be referenced to the chart in providing a direct reading of either rate of speed or time when one is a known factor and the other is an unknown factor.

DISCLOSURE

This invention relates to improvements in navigation instruments and methods of navigation.

The navigation instruments and methods of navigation herein set forth may be used in connection with navigational computation for virtually any type of vehicle. I have found the same to be particularly useful in connection with aircraft navigation and, for purposes of clarity, the same will be described in association with aircraft travel. It is, however, to be specifically understood that the invention is not limited to use in connection with aircraft.

In all aircraft flights, Aircraft Traffic Control (ATC) must be notified of the aircraft flight plan. ATC will then give clearance to the pilot to fly over selected chartered air courses, at a specified altitude, within a certain time span, and at a given air speed. That the pilot adhere fairly close to his flight plan is important in order to avoid mid-air collision in increasingly congested air lanes. This is particularly true under conditions of low or zero visibility, when the pilot will have to rely on ATC to maintain sufficient separation between planes to avoid a collision course with other planes.

In the navigation of commercial aircraft, in which the flight personnel include at least a pilot and co-pilot, there is always at least one person who can devote his full time and attention to flying the plane and another who can concentrate on navigation. However, in private planes, one person may serve as both pilot and navigator, and it is necessary that navigational computations be made rapidly and with facility.

In aircraft flight, it is obvious that there are a number of variables, and a pilot may very easily deviate from his flight plan unless he makes frequent in-flight computations. Under present practices, the pilot's navigational computations require a great deal of concentration and extensive calculations. For instance, the pilot knows from his air course chart or map, the distance from one checkpoint to another checkpoint. He must estimate, or approximate his air speed. Putting these two factors into a pocket calculator, the time enroute (in minutes or hours) is determined by calculation. His time enroute is then added to the departure time, mentally or with a writing instrument and paper. This then is the expected time of arrival (ETA) at the first checkpoint. The various operations required of the pilot are: (1) to take the distance in miles; (2) to take estimated air speed; (3) set distance in the calculator; (4) set air speed, or rate of speed into calculator; (5) read time enroute; (6) put down time enroute; (7) add to actual time of departure; (8) mentally, or using writing instrument and paper, convert this to actual ETA at the point of arrival. On arrival of the first checkpoint, the pilot notes actual time of arrival, and he must then determine his actual time enroute, put this in his calculator and calculate his actual m.p.h., or rate of speed. Now, using this newly calcuated m.p.h., or rate of speed, he must calculate his ETA at the second checkpoint. He then goes through the identical procedure as above. Then, with his ETA at the second checkpoint, he gives his actual time of arrival at the first checkpoint to ATC, plus his ETA at the second checkpoint. Other information is, of course, also given to ATC, such as altitude, identification, etc. This procedure must be followed from checkpoint to checkpoint until arrival at the next airport and on to completion of the flight.

Basically, my improved navigation instrument includes a sliding scale on which is indiced rate of speed, usually in miles per hour, and a stretchable and contractible band on which are indiced increments of time. The chart or map which the pilot uses in navigation is indexed for distance between checkpoint, and the indices of the scale and band will be correlated with each other and with the scale of the map or chart. Such distances will remain constant, and we are therefore concerned with three variables, departure time, arrival time, and rate of speed (m.p.h.). My improved navigational instrument works on basic calculator principles, that, knowing two of the variables, the third can be computed. Generally, navigational computations with my instrument, will be as follows:

(1) In determining the rate of speed at which the plane must fly in order to depart from point A at a certain time and arrive at point B at a certain time, the instrument is laid on the map or chart with the reference point thereof on point A indicating departure time and the sliding scale extended or retracted, which will cause stretching or contraction of the time indiced belt in accordance therewith, until the desired arrival time graduation overlays point B. The pilot can then read directly from the sliding scale the rate of speed (m.p.h.) which he must maintain in order to travel from point A to point B in a given time interval.

(2) When the pilot knows his departure time at point A and the rate of speed at which he plans to travel, the instrument is again placed on the map or chart with the reference point at point A, the sliding scale extended or retracted to the appropriate rate of speed, and he may then read directly from time indiced band the length of time it will take him to reach point B, which may be easily added to the departure time from point A to give him the ETA at point B.

(3) Conversely, knowing the time at which he wants to arrive at point B and the rate of speed at which he is going to travel, he may place the instrument with the reference point at point B and extend or retract the sliding scale to show rate of speed and read at point A, on the time indiced band, the time which he must allow for travel from point A to point B. Then, subtracting such time interval from the arrival time he will be able to determine the time at which he must depart point A in order to reach point B at a certain time.

Basically, the principle of the navigation instrument is to convert distance directly into time, or time directly into distance, or distance and time into rate of speed or measurements of distance. It is common practice to lay a rule, or scale, down on a chart or map and read distance. It is likewise common practice to put these factors into calculators and convert the same into time, m.p.h., fuel consumption, etc. My invention involves the use of a graduated rule or scale which is stretchable and contractible, and which, in the stretching and contraction, directly indicates its rate of stretch, so that many variables may be read directly from the instrument in association with the chart.

The primary object of this invention is the provision of a navigation instrument for time and rate of speed calculations which employs, as an essential element, a stretchable and contractible band having time indicia thereon and which may be laid on a map or chart for direct correlation and conversion of distance or position and time.

A further object is the provision of an instrument for use in association with a conventional navigation chart, map or the like, whereby many of the steps of present navigation techniques are eliminated, and the use of the new and novel instruments of this invention will tend to obviate many of the errors in calculation which occur in the steps of navigational methods heretofore employed.

A further object is the provision of a navigation instrument which may be employed for time and rate of speed calculations and which is small, of light weight and, while adjustable, contains but few parts and is not apt to become inoperable.

A further object of the invention is the provision of methods of determining time and rate of speed in a new and facile manner.

Other objects and advantages of the invention will be apparent during the course of the following detailed description of the invention, taken in connection with the accompanying drawings, forming a part of this disclosure, and in which drawings:

FIG. 1 is a top view of one form of the navigation instruments of this invention, small portions of the housing being broken away to disclose detailed details.

FIG. 2 is a fragmentary view showing the other side of the belt of FIG. 1.

FIG. 3 is a sectional view taken substantially on the line 3—3 of FIG. 1.

FIG. 4 is an enlarged fragmentary sectional view taken substantially on the line 4—4 of FIG. 1.

FIG. 5 is an enlarged fragmentary sectional view taken substantially on the line 5—5 of FIG. 1.

FIG. 6 is a fragmentary side elevational view of the instrument of FIG. 1 with the stretchable elastic belt thereof elongated beyond the showing in FIG. 1.

FIG. 7 is a top view of another form of the navigation instrument.

FIGS. 8, 9 and 10 are transverse vertical sectional views, taken substantially on their respective lines of FIG. 7.

Figure 12:
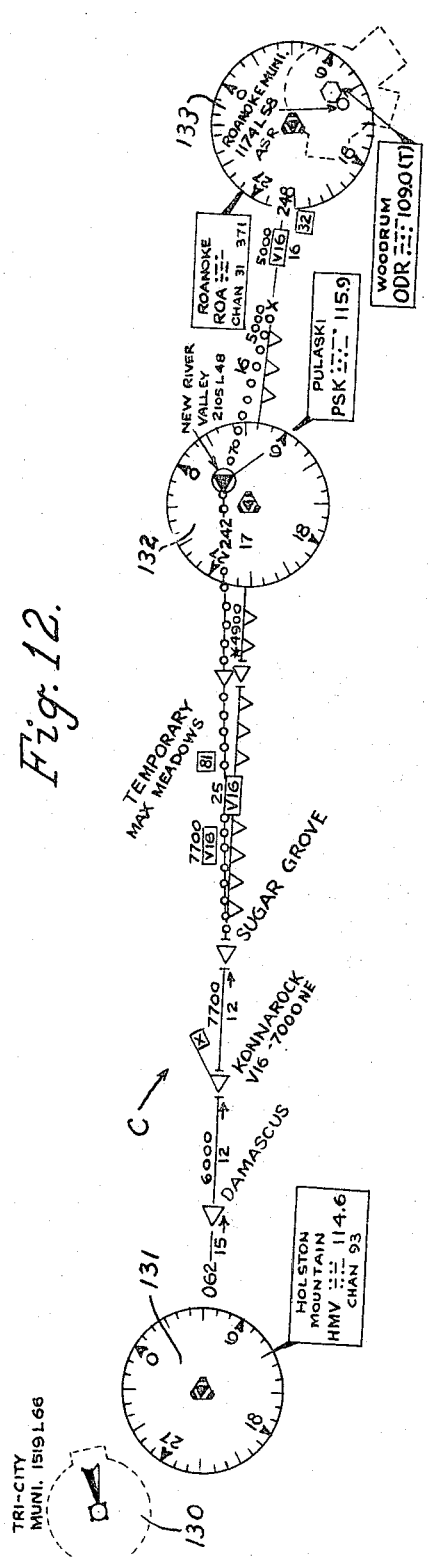
FIG. 12 is a fragmentary showing of a portion of a chart, as an example of one which may be used in association with the instruments of FIGS. 1–11, inclusive.
Figure 11:
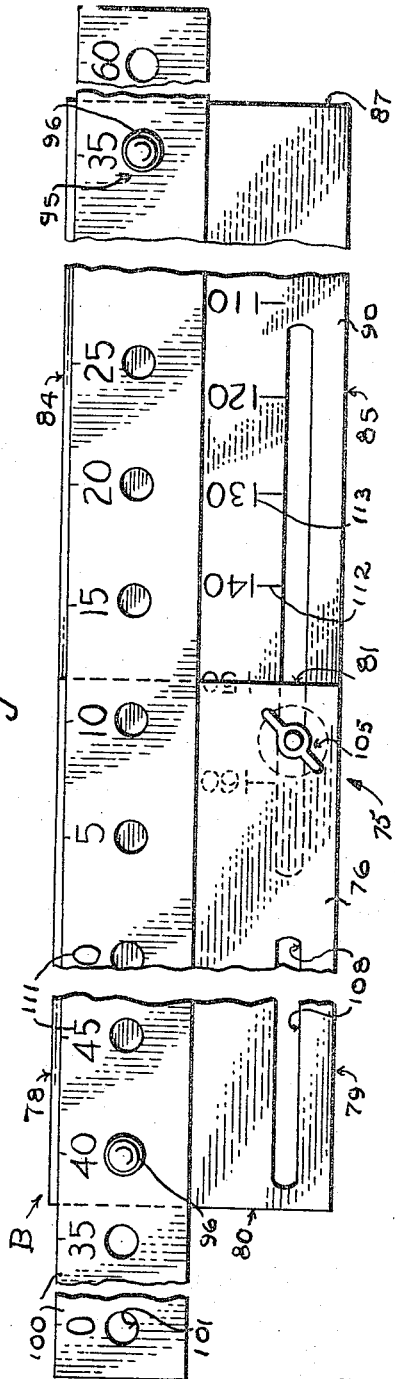
FIG. 11 is a top view of the instrument of FIG. 7 with the stretchable elastic band of the instrument thereof elongated beyond the showing in FIG. 7.

In the drawings, wherein for the purpose of illustration are shown two embodiments of the invention and wherein similar reference characters designate corresponding parts throughout the several views, the letter A may designate the form of invention as shown in FIGS. 1–6; B the form of invention as shown in FIGS. 7–11, and C a portion of a chart as shown in FIG. 12.

Forms A and B of the invention embody certain common features, including telescopic body means; band support means carried by the telescopic body means; stretchable and contractible bands carried by the band support means; and clamp means for retaining the telescopic body means in selected telescopic positions and the bands in selected contracted or stretched condition.

Navigation instrument A preferably includes telescopic body means 15 having two slidable sections 16 and 24, slidable one with respect to the other, each being of substantially transparent material. Section 16 has opposite parallel walls 17 and 18, joined by relatively narrow opposite parallel side walls 19 and 20, defining a four-sided box, open at both ends and containing a passageway 21 which slidably receives therewithin section 24. Section 24 preferably includes opposite parallel walls 25 and 26 and opposite parallel side walls 27 and 28, defining a four-sided box having a passageway 29 therewithin, the same being of a dimension whereby to slidably interfit within passageway 21 of section 16 with the walls of section 24 in sliding contact with the walls of section 16.

Walls 19 and 20 have, at like end portions of each, slots 30, and side walls 27 and 28 have, at like end portions thereof, slots 31 (shown in FIGS. 3 and 4). Slots 30 are at one end of telescopic body means 15 and slot 31 at the other end thereof, and provide support means for a stretchable and contractible band, as will be next described.

Band support means 35 of section 16 preferably comprises a roller 36 mounted on a shaft 37 which is rotatably supported in slots 30. Shaft 37 may be provided with a thumb and finger grip 38 at each end thereof, for manual rotation of roller 36. Band support means 40 of section 24 preferably comprises a roller 41 mounted on a shaft 42 which is rotatably supported in slots 31. Shaft 42 may be provided with grips 43, at each end thereof, for manual rotation of roller 41.

Stretchable band 45 is preferably in the form of an endless belt, and comprises a good quality rubber which is substantially uneffected by temperature changes and has a relatively even stretch throughout its length. Stretchable band 45 is entrained about rollers 36 and 41, as shown in FIG. 3, comprising a stretchable band carried by band support means 35 and 40.

Clamp means 50 is provided for selectively clamping sections 16 and 24 together against relative longitudinal movement. Clamp means 50 preferably comprises the cam structures of FIGS. 1 and 2, one being shown in FIG. 5. Cam member 51 is preferably an elongate generally cylindrical portion with an outwardly projecting cam face 52, and is mounted on a shaft 53 which is rotatably supported by projecting portions or ears 53' extending outwardly from walls 25 and 26. Shaft 53 is preferably keyed to member 51, and one portion thereof may be positioned to form a right angle with the remainder of the shaft and thus provide a finger-and-thumb hold 54.

Wall 25 of section 24 carries indicia which, in the form of invention herein shown, comprises spaced apart graduations 60 and numerals 61 associated therewith. These numerals may represent miles per hours of aircraft travel, and a typical arrangement of the same is shown in FIG. 1. In view of the fact that wall 18 is substantially transparent, the graduations and numerals on wall 25 may be readily seen through wall 18.

Belt 45 likewise includes indicia, which may comprise spaced apart graduations 65 and numerals 66, which, in the form of invention shown represent increments of time in minutes. As may be appreciated from FIG. 2, the graduations and time indicia likewise appear on that part of belt which is not seen in FIG. 1.

Wall 18 may be provided with cutout 70 and one or two pointers 71 (shown in FIG. 1) so that, upon adjustment of the two telescopic sections 16 and 24, pointers 71 will indicate the correct graduations 60 and numerals 61, which may be read through cutout 70. In FIG. 1, the pointers 71 point to the graduation of "120-miles-per-hour" numeral.

Navigation instrument A is calibrated for use with a chart or map wherein one inch equals twelve nautical miles. Charts and maps for navigation purposes are made on several different scales and it is obvious that the navigation instrument to be used in connection with a given map or chart must be calibrated according to the scale of the map or chart with which it is used. Chart C comprises a fragment of chart No. L–22, Enroute Low Altitude Chart, published by the U.S. Coast and Geodetic Survey, having a scale of one inch equals twelve nautical miles and which might be used in association with instrument A. This is the type of chart which would be used in relatively short flights by private planes and Chart C shows a fragment between Tri-City Municipal Airport and Roanoke Municipal Airport, in Virginia, including various radio points indicated by the triangles.

On longer flights, the most common chart used in general and private aviation for travel within the continental United States would be the Sectional Chart printed by the U.S. Government, and which has a scale of 1–500,000. For worldwide navigation, the pilot might use the World Aeronautical Chart which is also published by the U.S. Government, and covers the entire world at the same scale, usually 1–1,000,000. In use of the Sectional Chart or World Aeronautical Chart, the pilot would use an instrument A which was calibrated in accordance with the scale of these charts.

In use of instrument A with chart C, the procedure would be as follows:

This instrument will prove most useful in calculating ETA from one checkpoint to another and will thus be primarily described in this area.

Referring to chart C and computations of ETA relative thereto, we will assume flight from the departure point of Tri-City Municipal Airport, designated at 130, to Holston Mountain Radio, designated as 131, to Pulaski Airport, designated as 132, and to a destination of Roanoke, designated as 133. For the purposes of this example we will assume conditions of no wind and assume that the pilot has taken into consideration his initial climbing speed at the point of departure and descending speed at the destination point. We will likewise assume that the flight in progress will be a low flying private aircraft, flying at an average speed of 120 m.p.h., and that the instrument A is scaled to chart C.

In order to arrange instrument A to indicate a flying speed of 120 m.p.h., clamping means 50 is loosened and the two sections 16 and 24 will be drawn out or drawn in (as the case may be) so that the pointers 71 will point to indicia indicating 120 m.p.h. by numerals 61, which is the position shown on instrument A in FIG. 1. Clamping means 50 will then be tightened. This extension or retraction of sections 16 and 24 will extend or retract band 45 to correlate speed and time on the instrument. Band support means 35 and 40 will then be manipulated by hand, and band 45 will be rotated until the numeral indicia "0" of indicia 66 on band 45 is visible on the upper side of the instrument, adjacent the left-hand end thereof, usually aligned with shaft 37 of band support means 35, and will comprise the reference point for making computations from the instrument in this example. Now, laying instrument A with the reference point at Tri-City Municipal Airport and in a straight line therefrom to Holston Mountain radio, it can be directly read from the instrument that, at a speed of 120 m.p.h., the flying time from Tri-City Municipal Airport to Holston Mountain radio will be ten minutes, indicia 66 on band 45 reading 0 at Tri-City Municipal Airport and indicia 66 on band 45 reading 10 opposite Holston Mountain radio. Since the departure time is known to the pilot, ten minutes could be added thereto, which will give him the estimated time of arrival at Holston Mountain radio. The flying time from Holtson Mountain radio to Pulaski Airport can then be readily computed by again placing the reference point at Holston Mountain radio and reading directly the time on band 45 which will be indicated as flying time at 120 m.p.h. from Holston Mountain radio to Pulaski Airport, which in this case will be 40½ minutes. Since the departure time from Holston Mountain radio is known, the pilot can readily add 40½ minutes to such time, which will give him his ETA at Pulaski Airport. Navigational computation from checkpoint to checkpoint will be continued in a like manner until the ultimate destination is reached.

Calculation of departure time in order to reach a certain destination at a given time, knowing the rate of speed, can be easily computed by merely subtracting the flying time as previous ascertained from the desired arrival time.

In many cases, the pilot will encounter either a head wind or a tail wind, so that his air speed differs from his ground speed. For instance, let us assume that the pilot ran into head winds between Pulaski Airport and Roanoke Municipal Airport, but his ultimate destination was beyond Roanoke Municipal Airport, say, Washington, D.C. He could readily see or be advised by air traffic control that his actual time of arrival at Roanoke Municipal Airport was later than his ETA and he would know the actual time that it took him to fly between Pulaski radio and Roanoake Municipal Airport. He would then adjust the instrument to his actual ground speed, in m.p.h., by retraction of section 24 to within section 16 until the actual flying time from the reference point to Roanoke Municipal Airport coincided with the time increment between the reference point and time indicia on band 45. His actual ground speed involved per hour would then appear opposite pointers 71 and, using this setting he can then proceed to ascertain his ETA for the next checkpoint according to this setting.

Since the distances between checkpoints is usually less than that which would consume 60 minutes of flying time, band 45 is preferably calibrated up to 60 minutes, so that if the pilot wishes to avoid any addition or subtraction to departure or time in calculating his ETA, he can place, at a reference point, the indicia 66 of band 45 which corresponds to the actual minutes past the hour at which he departs a given location and can then directly read on the scale the time at which he will arrive.

Navigation instrument B preferably includes telescopic body means 75 having slidable sections 76 and 90. Sections 76 and 90 are preferably substantially transparent plates disposed in face to face relationship and are preferably rectangular. Section 76 is shown as having side edges 78 and 79, end edges 80 and 81, outer face 82, and inner face 83. Section 90 is shown as having side edges 84 and 85, end edges 86 and 87, outer face 88 and inner face 89.

Band support means 95 (FIGS. 7, 8 and 9) are carried by telescopic body means 75 and preferably include a plurality of spaced apart buttons 96, one being carried by section 76 and another by section 90 substantially as positioned in FIG. 7. Buttons 96 have a reduced neck portion 97 and are secured to the sections in any approved manner, such as by an inner disc portion 98 adhesively retained in openings in the section. The buttons are adapted to releasably retain band 100 in a suitably stretched condition.

Band 100 may be of the same material as that of band 45 previously discussed in connection with form A. However, band 100 is preferably a single length of material provided with a plurality of spaced apart openings 101 through which buttons 96 may be passed in order to retain band 100 in selected stretched or contracted positions.

Clamp means 105 is provided to retain the two sections 76 and 90 in various clamped positions, one with respect to the other, and may comprise a plurality of thumb nuts 106 (two preferably being employed) (as shown in FIG. 7) mounted upon screw threaded shanks 107, the base portions of which are firmly attached to the section 76 to project from the face 88 thereof and to extend through any of the various slots 108 extending longitudinally of section 76 whereby, when the thumb nuts are screwed down, they will firmly engage face 82 of section 76 and retain the two sections as above. Obviously, as the two sections are spread further apart, band 100 will stretch.

Indicia upon band 100 is preferably like that upon band 45 and comprises graduations 110 and numerals 111. In addition, section 83 contains graduation and numeral indicia 112 and 113, preferably similar to indicia 60 and 61 of instrument A.

Instrument B is used, by extension and contraction of section 76 with respect to section 90 and the corresponding stretching or contraction of band 100 in the same manner as previously described in connection with form A.

As described, it will be seen that instruments A and B basically include a telescopic body means having indicia thereon, stretchable and contractible band means having indicia thereon, and support means for mounting the band means on the body means for respective stretching and contracting thereof in accordance with respective telescopic extension and retraction of the body means. The indicia of the body means is correlated to the indicia of the band means, and both are correlated to the scale of the chart or map in connection with which the instrument is to be used. In computations with these instruments, distance on the chart or map is a known factor and the notations on either the body means or the band means will be another known factor and the known factors may be respectively positioned to provide a direct reading on the instrument of the unknown factor. The invention is therefore not limited merely to the provision of an instrument having correlated time and rate of speed indicia. For instance, indicia 61 of form A and indicia 113 of form B might be calibrated in gallons per hour, so that the same could be used in computing fuel consumption whereby the pilot could directly read the fuel required from point A to point B, or the distance he can travel on the fuel he has in his tanks. The invention is thus not limited to merely the indicia shown, but resides in the overall concept of the instrument as a calculator whereby to readily compute an unknown from two known factors.

It is thus to be observed that I have provided a navigation instrument and method of navigation which includes the necessity for minimum computations on the part of the pilot.

Various changes in the size, shape and arrangement of parts may be made to the forms of invention herein shown and described without departing from the spirit of the invention or scope of the following claims.

I claim:
1. In a navigation instrument for use in association with a navigation chart having linear distance measurements of a given scale, the combination of a frame including a first body portion and a second body portion, means interconnecting said body portions for linear movement of one with respect to the other, clamp means for releasably securing one of said body portions at a predetermined linear position with respect to the other, one of said body portions having increments of rate of speed indicia thereon correlated to the scale of the chart and being positioned for indexing thereof in reference to the chart by linear movement of one of said body portions with respect to the other, stretchable and contractible band means having increments of time indicia thereon and correlated to the scale of the chart and to the indicia of said frame, said time indicia being positioned on said band means for increasing and decreasing the length of increments thereof on respective expansion and contraction of said band means, support means for mounting said band means in a normally stretched condition on said frame and in interconnection with each said body portion for expansion and contraction of said band means in variation of the length of increments of said indicia thereof in accordance with the linear positioning of one of said body portions with respect to the other, said band means being mounted on said frame for indexing of said indicia of said band means in reference to the chart and in reference to the indicia of said frame by linear movement of one of said body portions with respect to the other, whereby upon linear movement of one of said body portions with respect to the other to index a known rate of speed, the instrument referenced with the chart provides a direct reading of time for traversing a given linear distance measurement of the chart at the known rate of speed, and whereby upon linear movement of one of said body portions with respect to the other to index a known time referenced with the chart, a direct reading is provided of the rate of speed in traversing a given linear distance measurement of the chart in the known time.

2. A navigation instrument as specified in claim 1 wherein said frame comprises telescopic first and second body portions linearly movable one with respect to the other, said clamp means being operable to secure said telescopic body portions in selected telescoped linear positions one with respect to the other.

3. A navigation instrument as specified in claim 2 wherein at least one of said telescopic body portions is transparent and is the uppermost portion when said instrument is in use and is provided with an indicator portion, and the other of said telescopic body portions is provided with said increments of rate of speed indicia so that said indicator portion will successively align with said increments of rate of speed indicia upon telescoping of said telescopic body portions.

4. A navigation instrument as specified in claim 2 wherein said support means comprises a roller rotatably carried by one of said telescopic body portions and a roller rotatably carried by the other of said telescopic body portions, and said band means comprises an endless belt trained over said rollers, said rollers being disposed adjacent end portions of said telescopic body portions remote from one another.

5. A navigation instrument as specified in claim 4 wherein each of said telescopic body portions have parallel side walls and are open at their ends and said rollers are disposed between said side walls.

6. A navigation instrument as specified in claim 2 wherein said support means comprises a fastener portion carried by one of said telescopic body portions and a fastener portion carried by the other of said telescopic body portions; and said band means comprises an elongate strip provided with a plurality of spaced-apart openings, any one of which being constructed and arranged to be fastened over either fastener portion to retain said band means in a stretched condition; said fastener portions being disposed adjacent end portions of said telescopic body portions remote from each other.

7. A navigation instrument as specified in claim 6 wherein said telescopic body portions are plates and said fastener portions are secured to the faces of said plates facing in the same direction.

References Cited
UNITED STATES PATENTS

| | | | |
|---|---|---|---|
| 2,396,929 | 3/1946 | Putman | 33—137 |
| 3,120,707 | 2/1964 | Ewing | 33—137 |
| 3,193,195 | 7/1965 | Jeffries | 235—61 |
| 3,213,544 | 10/1965 | Adler | 33—158 |
| 3,248,797 | 5/1966 | Selleck | 33—169 |

STEPHEN J. TOMSKY, *Primary Examiner.*